UNITED STATES PATENT OFFICE.

ALEXANDER HAMILTON, OF CHICAGO, ILLINOIS.

FOOD COMPOUND.

1,076,825. Specification of Letters Patent. Patented Oct. 28, 1913.

No Drawing. Application filed November 18, 1912. Serial No. 731,946.

*To all whom it may concern:*

Be it known that I, ALEXANDER HAMILTON, a citizen of the United States, residing at Chicago, in the county of Cook and State of Illinois, have invented certain new and useful Improvements in Food Compounds, of which the following is a description.

The object of my invention is to provide a simple, cheap and nutritious preserved food-compound adapted for ready use in the preparation of soup in which beef, mutton or other bones, ordinarily wasted, may be utilized to advantage and so treated and combined with a suitable meat-constituent and a preservative as to prevent decay and enable it to be utilized by merely adding water thereto and heating the mixture.

To these ends my invention consists both in the process or method by which said product is produced,—all of which is hereinafter more particularly described and definitely pointed out in the claims.

It is well known that large quantities of bones from packing houses are wasted because no means has heretofore been devised for preserving them in proper form so that they may be utilized as a food product. I have found, however, that when properly treated and combined with a meat or meat and vegetable constituent, they may be preserved indefinitely and may be made to form the basis of a most excellent, varied and nutritious food.

In preparing the compound, the bones should first be carefully washed and then ground, crushed or broken in pieces of substantially uniform size, preferably not so large but that they could be passed through an inch ring. They should then be placed in a strong salt solution and there kept until the salt is well absorbed, which would ordinarily require about twenty-four hours. The crushed or comminuted bone particles should then be taken from the salt solution and thoroughly dried or roasted in a suitable oven,—preferably of rotary form.

A meat constituent, which may consist of ground meat particles or meat extract, preferably the latter, should then be added and thoroughly commingled therewith, and the mixture again subjected in a similar manner to a drying process. The quantity of meat constituent may vary in bulk according to its form, but in any event, it should be sufficient to afford the necessary nutriment, "body" and meat flavor, when added to a given quantity of water and converted into soup. If ground meat be utilized, a greater proportion in bulk should be used than when in the form of a concentrated extract. Of the former, I would recommend about ten to twenty per cent., more or less, of the bone mass, while of the latter, a sufficient quantity to moisten the mass when mixed would ordinarily be sufficient. In addition to the meat constituent proper, I would also recommend the use of a small quantity of animal fat, such, for example, as beef or mutton tallow, lard or salt-pork grease, which should be added when the bone particles and meat constituent are commingled and dried. Any desired flavor or vegetable constituent or condiment, such, for example, as celery, tomato, pepper, or the like, may be added at the same time.

When the compound is dried, it is separated by weight or bulk into uniform portions and each portion placed in a separate bag or receptacle formed from a suitable, coarse fabric, preferably cheese-cloth. This package in turn should be wrapped in paraffin paper to preserve it from contamination, when it is ready for use. I would recommend that enough of the compound be placed in each package to provide for a given portion of soup, such, for example, as would suffice for one meal for an average family.

In using the product, one of the bags would be placed in an ordinary kettle, with the requisite quantity of water, and boiled. The bag, which serves to retain the bone particles, may then be removed, when the soup, with all of the nutriment of the package, will be ready to be served.

One or more of the packages may be placed in a suitable carton and marketed or kept for use.

The many advantages of the compound as a food preparation are too obvious to require special mention.

Having thus described my invention, what I claim and desire to secure by Letters Patent is:

1. The herein described method of preparing a preserved food-compound adapted for the preparation of soups, which consists in crushing or comminuting bones, subjecting the comminuted particles for a predetermined time to the action of a salt solution, commingling the same with a meat constituent and drying the mass.

2. The herein described method of preparing a preserved food-compound adapted for the preparation of soups, which consists in crushing or comminuting bones, subjecting the particles for a predetermined time to the action of a salt solution, drying said particles, commingling the same with a meat constituent and again drying the mass.

In testimony whereof, I have signed this specification in the presence of two subscribing witnesses, this 15th day of November 1912.

ALEXANDER HAMILTON.

Witnesses:
DAVID H. FLETCHER,
LESLIE W. FRICKE.